United States Patent [19]

Paull et al.

[11] 4,099,383
[45] Jul. 11, 1978

[54] PARTIAL OXIDATION PROCESS

[75] Inventors: Peter L. Paull, Weston, Conn.; Rodney McGann, Northridge, Calif.

[73] Assignee: Texaco Inc., New York, N.Y.

[21] Appl. No.: 698,438

[22] Filed: Jun. 21, 1976

[51] Int. Cl.² ............................................. F01K 27/00
[52] U.S. Cl. ........................................ 60/648; 60/655; 48/197 R; 48/215; 252/373
[58] Field of Search .............. 48/197 R, 215; 60/648, 60/670, 655, 39.12; 252/373

[56] References Cited

U.S. PATENT DOCUMENTS

| | | | |
|---|---|---|---|
| 1,951,990 | 3/1934 | Noack | 48/197 R |
| 1,993,585 | 3/1935 | Baumann et al. | 60/655 |
| 2,471,755 | 5/1949 | Karrer | 60/655 |
| 3,715,301 | 2/1973 | Tassoney et al. | 48/197 R |
| 3,866,411 | 2/1975 | Marion et al. | 48/215 X |
| 3,922,148 | 11/1975 | Child | 48/197 R |

FOREIGN PATENT DOCUMENTS

| | | | |
|---|---|---|---|
| 740,197 | 11/1955 | United Kingdom | 60/655 |

Primary Examiner—Allen M. Ostrager
Assistant Examiner—Stephen F. Husar
Attorney, Agent, or Firm—Thomas H. Whaley; Carl G. Ries; Albert Brent

[57] ABSTRACT

Sensible heat in the hot effluent gas stream leaving a partial oxidation gas generator for the production of gaseous mixtures comprising $H_2 + CO$ i.e. synthesis gas, reducing gas, or fuel gas, is used at maximum temperature to heat a stream of heat transfer fluid preferably comprising a portion of the product gas circulating in a substantially closed loop. The heat transfer fluid serves as the working fluid in a turbine that produces mechanical work, electrical energy, or both. Further, the heat transfer fluid leaving the turbine may be used to preheat hydrocarbonaceous feed and free-oxygen containing gas which is then introduced into the gas generator. Optionally, by-product superheated steam may be produced at high temperature levels for use in the gas generator and as the working fluid in an expansion turbine. The high steam superheat temperatures results in higher conversion efficiencies.

37 Claims, 1 Drawing Figure

PARTIAL OXIDATION PROCESS

BACKGROUND OF THE INVENTION

1. Field of the Invention

This invention pertains to a partial oxidation process for making synthesis gas, fuel gas, or reducing gas along with mechanical work, electrical energy, or both.

2. Description of the Prior Art

In the partial oxidation process, the effluent gas stream leaving the gas generator at a temperature in the range of about 1500° to 3000° F must be cooled below the equilibrium temperature for the desired gas composition. This is presently done by quenching the effluent gas stream in water, or by cooling the gas stream in a waste heat boiler, thereby producing saturated steam. Both of these methods of gas cooling result in large increases in entropy and reduced thermal efficiencies. This problem is substantially overcome in the subject process by using the sensible heat in the hot effluent gas stream leaving the partial oxidation gas generator at a higher level of heat exchange.

Coassigned U.S. Pat. No. 3,868,817 discloses the production of a purified fuel gas which is burned in the combustion chamber of a gas turbine. The clean flue gas is then expanded in a turbine.

SUMMARY

At its maximum exit temperature i.e. 1500°–3500° F, an effluent gas stream comprising raw synthesis gas, reducing gas, or fuel gas from a free flow noncatalytic partial oxidation gas generator is passed through a first heat exchange zone in heat exchange with a continuous stream of heat transfer fluid preferably comprising a portion of the product gas which circulates in a substantially closed power loop. The heat transfer gas absorbs heat from the effluent gas stream and is then passed through a turbine to produce mechanical work and electrical energy. The hydrocarbonaceous feed stream, and optionally the free-oxygen containing gas feed stream to the gas generator may be separately preheated in a separate heat exchange zone by heat exchange with the heat transfer fluid leaving said turbine. Optionally, by-product steam and superheated steam may be produced subsequently by the absorbtion of sensible heat remaining in the effluent gas stream. The high steam superheat temperature gives a high conversion efficiency in a steam turbine.

BRIEF DESCRIPTION OF THE DRAWING

The invention will be further understood by reference to the accompanying drawing which is a schematic representation of a preferred embodiment of the process.

DESCRIPTION OF THE INVENTION

The present invention pertains to an improved continuous partial oxidation gasification process for producing synthesis gas, reducing gas, or fuel gas along with valuable by-product saturated and superheated steam. Mechanical work i.e. gas compression, and electrical energy are also produced by the process. The aforesaid gas streams comprise $H_2$, CO, and at least one member of the group $H_2O$, $CO_2$, $H_2S$, COS, $CH_4$, $N_2$, A, and particulate carbon.

Figure 1:
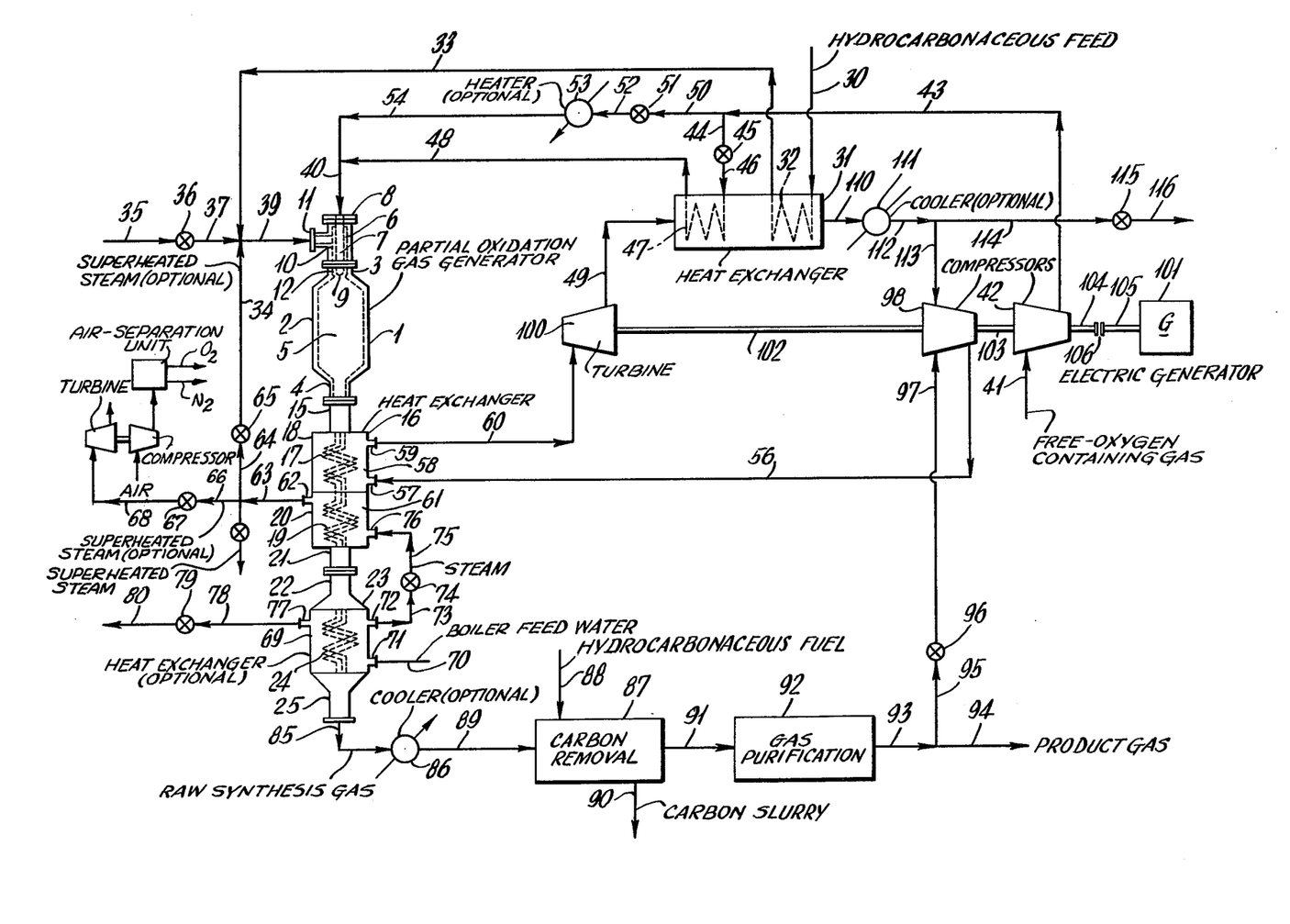

In the subject process, a continuous effluent gas stream of raw synthesis gas, reducing gas or fuel gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No. 2,992,906 issued to F. E. Guptill, Jr.

A wide range of combustible carbon containing organic materials may be reacted in the gas generator with a free oxygen containing gas optionally in the presence of a temperature moderating gas to produce said effluent gas stream.

The term hydrocarbonaceous is used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous." For example there are (1) pumpable slurries of solid carbonaceous fuels, such as coal, lignite, particulate carbon, petroleum coke, concentrated sewer sludge, and mixtures thereof in water or a liquid hydrocarbon; (2) gas-solid suspension such as finely ground solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by products from chemical processes containing oxygenated hydrocarbonaceous organic materials and mixtures thereof.

The hydrocarbonaceous feed may be at room temperature or it is preferably preheated to a temperature up to as high as about 600° to 1,200° F, say 800° F but preferably below its cracking temperature. Preheating the hydrocarbonaceous feed may be accomplished by non contact heat exchange with heat transfer fluid that was previously heated by heat exchange with the effluent gas stream directly leaving the gas generator. The hydrocarbonaceous feed may be introduced into the burner in liquid phase or in a vaporized mixture with a temperature moderator. Suitable temperature moderators include superheated steam, saturated steam, unsaturated steam, water, CO$_2$-rich gas, a portion of the cooled exhaust from a turbine employed downstream in the process, nitrogen in air, by-product nitrogen from a conventional air separation unit, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner.

From about 0 to 100% of the superheated steam produced subsequently in the subject process may be used to preheat and disperse the liquid hydrocarbonaceous feed, or to preheat and entrain the solid carbonaceous fuels and then introduced into the gas generator.

The weight ratio of total amount of H$_2$O to fuel introduced into the reaction zone of the gas generator is in the range of about 0 to 5.

When comparatively small amounts of H$_2$O are charged to the reaction zone, for example through the burner to cool the burner tip, the H$_2$O may be mixed with either the hydrocarbonaceous feedstock, the free-oxygen containing gas, the temperature moderator, or a combination thereof. In such case, the weight ratio of water to hydrocarbonaceous feed may be in the range of about 0.0 to 1.0 and preferably 0.0 to less than 0.2.

The term free-oxgen containing gas, as used herein is intended to include air, oxygen-enriched air, i.e. greater than 21 mole % oxygen, and substantially pure oxygen, i.e. greater than 95 mole % oxygen, (the remainder comprising N$_2$ and rare gases). Free-oxygen containing gas may be introduced into the burner at a temperature in the range of about ambient to 1,800° F. The ratio of free oxygen in the oxidant to carbon in the feedstock (O/C, atom/atom) is preferably in the range of about 0.7 to 1.5. Preheating the free-oxygen containing gas may be accomplished by noncontact heat exchange with a heat transfer fluid that was previously heated by heat exchange with the effluent gas stream directly leaving the gas generator. In such case, the heat transfer fluid is preferably inert.

The feedstreams are introduced into the reaction zone of the fuel gas generator by means of fuel burner. Suitably, an annulus-type burner, such as described in coassigned U.S. Pat. No. 2,928,460 issued to duBois Eastman et al, may be employed.

The feedstreams are reacted by partial oxidation without a catalyst in the reaction zone of a free-flow gas generator at an autogenous temperature in the range of about 1500° to 3500° F and at a pressure in the range of about 1 to 250 atmospheres absolute (atm. abs.). The reaction time in the fuel gas generator is about 1 to 10 seconds. The effluent stream of gas leaving the gas generator may comprise CO, H$_2$, CO$_2$, CH$_4$, H$_2$O, N$_2$, A, H$_2$S, and COS. Unreacted particulate carbon (on the basis of carbon in the feed by weight) is about 0.2 to 20 weight percent from liquid feeds but is usually negligible from gaseous hydrocarbon feeds. The specific composition of the effluent gas is dependent on actual operating conditions and feedstreams. Synthesis gas substantially comprises H$_2$+CO; all or most of the H$_2$O and CO$_2$ are removed for reducing gas; and the CH$_4$ content is maximized for fuel gas.

A continuous stream of hot effluent gas, at substantially the same temperature and pressure as in the reaction zone leaves from the axial exit port of the gas generator and is then introduced directly to a first heat exchange zone. Optionally, a solids separation zone (not shown in the drawing) may be inserted between the exit port of the gas generator and said first heat exchange zone. The solids separation zone may comprise a free-flow catch-pot i.e. slag chamber which may be inserted in the line before the first heat exchanger. By this means at least a portion of any solid matter i.e. particulate carbon, ash, slag, refractory, and mixtures thereof that may be entrained in the hot effluent gas stream, or which may flow from the gas generator i.e. slag, ash, bits of refractory may be separated from the effluent gas stream and be recovered with very little, if any, pressure drop in the line. A typical free-flow slag chamber that may be employed is shown in FIG. 1 of the drawing for coassigned U.S. Pat. No. 3,528,930. Thus in the subject process carbon from the effluent gas stream, scale, and solidified slag or ash from the fuel and refractory may be withdrawn periodically from a solids separation zone, such as from the lowermost portion of the slag-accumulation zone 23 in U.S. Pat. No. 3,528,930.

At least a portion of the sensible heat in the effluent gas stream directly leaving the gas generator or the solids separation zone is recovered in a first heat exchange zone. Thus, noncontact heat exchange takes place in a heat exchange zone between a continuous stream of heat transfer fluid entering from a closed power loop and the continuous stream of effluent gas directly leaving the gas generator at an exit temperature in the range of about 1500°–3500° F. The heat transfer fluid enters the first heat exchange zone at a temperature in the range of about 500° to 1300° F and leaves at a temperature in the range of about 1300° to 2800° F. The hot raw gas stream is reduced in temperature about 700° to 2700° F by giving up at least a portion of its sensible heat to the heat transfer fluid. Optionally, the raw gas stream may be then further cooled, cleaned to remove particulate carbon, purified to remove unwanted gas constituents, and used as product gas. Cooling to a temperature in the range of about 350° to 750° F and some cleaning may be effected by contacting the gas stream with a scrubbing fluid. For example, the raw gas stream may be immersed in water or a liquid hydrocarbon contained in a quench tank such as shown in coassigned U.S. Pat. No. 2,896,927. Other suitable gas cleaning and purifying methods will be described later.

Optionally in a third heat exchange zone downstream in the process, a portion the remaining sensible heat in the process gas stream may be passed in noncontact heat exchange with boiler-feed-water and thereby produce steam having a temperature in the range of about 298° to 705° F and a pressure in the range of about 65 to 3500 psia. In such case the temperature of the process gas may drop about 300° to 1000° F.

In another embodiment of the process, the process gas stream directly after being passed in noncontact heat exchange with said heat transfer fluid in said first heat exchange zone is passed into a second heat exchange zone in noncontact heat exchange with a continuous stream of steam, in the manner as previously produced in said third heat exchange zone. Thus, superheated steam may be produced at a temperature in the range of about 750° to 1100° F and a pressure in the range of about 65 to 3500 psia.

At least a portion of the by-product superheated steam produced by the subject process may be introduced into the partial oxidation gas generator where it may react and thereby contribute to the amount of hydrogen in the effluent gas stream. Further, the thermal efficiency of the process is improved. Condensation problems that may result when steam and hydrocarbonaceous fuels are mixed together may be avoided by using superheated steam. Advantageously, a portion of the superheated steam may be used as the working fluid in a turbocompressor to compress air feed to an air separation unit for producing substantially pure oxygen (95 mole % or more). At least a portion of this oxygen may be introduced into the gas generator as the oxidant reactant. The superheated steam may also be used as the working fluid in a turboelectric generator. Starting with superheated steam at a very high temperature level and converting the heat into electricity favorably affects the conversion efficiency.

As used herein by definition, the word "noncontact" means that there is no mixing between the two gas streams. Preferably, these two streams run in opposite directions i.e. indirect flow. However, they may run in the same direction i.e. direct flow. Any suitable heat exchanger that is capable of withstanding the temperatures and pressures of the fluids may be used. Heat resistant metals and ceramics may be employed as construction materials. Shell and tube and fire-tube construction may be employed.

The three heat exchange zones may be contained in separate vessels connected in series. Alternately, heat exchange zones 1 and 2; or 2 and 3; or 1, 2, and 3 may be obtained within the same shell. For example, the first and second heat exchange zones may be contained within the first shell and the third heat exchanger may be contained in a separate shell connected in series with the first shell, as shown in the drawing.

The effluent gas stream from the gas generator may flow through the tubes of a shell and tube-type heat exchanger or pass through in the shell side of any of the three heat exchangers. Simultaneously, the other fluid passes in heat exchange through the remaining path in noncontact preferably indirect flow. However, the preferred procedure to prevent solids build-up and fouling of the heat exchanger is to split the effluent gas stream into a plurality of high velocity streams, which are passed through a plurality of small diameter coils or tubes in the heat exchanger.

The heat transfer fluid heated in heat exchange zone 1 is preferably a portion of the synthetic gas, reducing gas, or fuel gas produced in the process and comprises in mole %: $H_2$ 70 to 10, CO 15 to 57, $CO_2$ 0 to 5, N 0 to 75, A 0 to 1.0, $CH_4$ 0 to 25, $H_2S$ 0 to 2.0, COS 0 to 0.1, and $H_2O$ 0 to 20.

Other heat transfer fluids which may be used in the closed power loop may be selected from the group $H_2O$, helium, nitrogen, argon, hydrogen, and mixtures comprising $H_2+CO$. Hydrogen transfers more heat with less material and at a lower metal temperature. Further, hydrogen may be produced in the subject process by purifying the effluent gas stream, to be further described. Because hydrogen is readily available as a low cost by-product of the subject process, and because of its favorable thermal properties, hydrogen is particularly advantageous for use as a heat transfer fluid. Alternately, the heat transfer fluid may be selected from the group sodium, potassium, mercury, and sulphur in gaseous or liquid state.

The hot heat transfer fluid leaves the first heat exchange zone at a temperature in the range of about 1300° to 2800° F and a pressure in the range of about 150 to 1500 psia and is passed through at least one power-developing turbine as the working fluid. Coupled through a variable-speed drive if desired to the axis of the turbine and driven thereby may be at least one electric generator and at least one turbo compressor or pump. Thus, free-oxygen containing gas may be compressed to the desired loop pressure by means of another compressor. Alternately, a single multi-stage turbocompressor may be employed with the different fluids being compressed in the different stages of the compressor.

The heat transfer fluid may leave the turbine at a temperature in the range of about 500° to 1800° F. Preferably, the pressure is in the range of about 15 to 150 psia. It may be then passed through a fourth heat exchange zone in noncontact heat exchange with a feed stream of hydrocarbonaceous fuel. Optionally, the free-oxygen containing gas feedstream may be similarly preheated. In such case, the heat transfer fluid in the power loop should preferably be one which would not react with the oxygen in the event of leakage. Two separate conventional shell and tube-type heat exchangers connected in tandem may be employed in the fourth heat exchange zone. Alternately, two heat exchangers contained in the same shell may be employed to preheat these two separate feed streams. The heat transfer fluid may be passed through the tubes or through the shell side in one or both heat exchangers.

When the free-oxygen feed stream is preheated in said fourth heat exchange zone, the temperature of the stream of heat transfer fluid after heat exchange with the free-oxygen containing gas may be in the range of about 100° to 1500° F. The free-oxygen containing gas may enter the system at a temperature in the range of about ambient to 1000° F and a pressure in the range of about atmospheric to 3500 psia. After being compressed to a pressure above that of the gas generator by means of said compressor, the free-oxygen containing gas may be preheated to a temperature in the range of about 200° to 1800° F by noncontact heat exchange with said heat transfer fluid as previously described, or in a separate heater, and then passed into said gas generator by way of a burner.

The temperature of the stream of heat transfer fluid after heat exchange with the hydrocarbonaceous feed may be in the range of about 60° to 1200° F, but above the solidification temperature. The hydrocarbonaceous fuel, or liquid oxygenated hydrocarbonaceous fuel, or slurry of solid carbonaceous fuel and water or liquid hydrocarbon enters the system at a temperature in the range of about ambient to 500° F. The hydrocarbonaceous feed to the gas generator may be preheated by being pumped through said heat exchanger in noncontact heat exchange with said heat transfer fluid where its temperature is increased to a value in the range of about 200° to 1200° F.

Alternately, the heat transfer fluid in the fourth heat exchange zone may be cooled to a temperature in the range of about 60° to 300° F by noncontact heat exchange with boiler feed water. The boiler feed water may enter the fourth heat exchange zone at a temperature of about ambient to 705° F and may leave as hot water or steam at a temperature in the range of about 100° to 1100° F. Optionally, the steam produced may be used as the working fluid in a steam turbine.

By way of a burner, the aforesaid preheated stream of free-oxygen containing gas and the stream of hydrocarbonaceous feed optionally in admixture with a temperature moderator, are then introduced into the partial oxidation gas generator. The impinging streams produce in the reaction zone a gaseous dispersion of hydrocarbonaceous fuel in free-oxygen containing gas and optionally temperature moderator.

After heat exchange with said hydrocarbonaceous feed stream, the heat transfer fluid may be optionally passed through another heat exchanger. For example, boilerfeed-water at ambient temperature may be preheated to a temperature in the range of about 100° to 500° F by noncontact heat exchange with said heat transfer fluid which may be reduced to a temperature in the range of about 60° to 300° F, but above the solidification temperature.

The temperature and preferably the pressure of said heat transfer fluid are then increased and the cycle is repeated as previously discussed. In the case of a gaseous heat transfer fluid, pressure is increased to about 150 to 1500 psia by means of a compressor driven by an expansion turbine. Similarly, a turbine driven or magnetic pump may be used for circulating heat transfer fluids in the liquid state.

The heat transfer fluid may remain in the gaseous phase throughout the power loop. Alternately, the heat transfer fluid may remain in the liquid phase throughout the power loop. In still another embodiment, the heat transfer fluid may change from one phase i.e. liquid or gaseous to the other phase in the power loop, depending on the conditions of temperature and pressure. For example, the heat transfer fluid may be pumped into the first heat exchange zone as a liquid and vaporized therein by absorbing heat from the effluent gas stream from the gas generator. The gaseous heat transfer fluid is then expanded in a power producing turbine. Then by heat exchange with one or more feedstreams to the gas generator or with $H_2O$, the heat transfer fluid may be cooled and condensed into the liquid phase. A pump may be used to circulate the liquid heat transfer fluid back to the first heat exchange zone, and the cycle is then repeated. Magnetic pumps may be used which may be energized by an electric generator that is driven by said turbine.

The raw product gas stream leaves the third heat exchanger where boiler feed water is converted into steam, and optionally it may be passed through another heat exchanger where the temperature may be reduced about 50° to 500° F.

The cooled stream of raw product gas is passed into a gas cleaning zone where particulate carbon and any other entrained solids may be removed therefrom. Slurries of particulate carbon in a liquid hydrocarbon fuel may be produced in the cleaning zone, and may be recycled to the fuel gas generator as at least a portion of the feedstock. Any conventional procedure suitable for removing suspended solids from a gas stream may be used. In one embodiment of the invention, the stream of raw product gas is introduced into a gas-liquid scrubbing zone where it is scrubbed with a scrubbing fluid such as liquid hydrocarbon or water. A suitable liquid-gas tray-type column is more fully described in coassigned U.S. Pat. No. 3,816,332 - C. P. Marion.

Thus, by passing the stream of raw synthesis gas up a scrubbing column in direct contact and countercurrent flow with a suitable scrubbing fluid or with dilute mixtures of particulate carbon and scrubbing fluid flowing down the column, the particulate carbon may be removed from the synthesis gas. A slurry of particulate carbon and scrubbing fluid is removed from the bottom of the column and sent to a carbon separation or concentration zone. This may be done by any conventional means that may be suitable e.g. filtration, centrifuge, gravity settling, or by liquid hydrocarbon extraction such as the process described in coassigned U.S. Pat. No. 2,992,906. Clean scrubbing fluid or dilute mixtures of scrubbing fluid and particulate carbon are recycled to the top of the column for scrubbing more synthesis gas.

Other suitable conventional gas cooling and cleaning procedures may be used in combination with or in place of the aforesaid scrubbing column. For example, the stream of synthesis gas may be introduced below the surface of a pool of quenching and scrubbing fluid by means of a diptube unit. Or the stream of synthesis gas may be passed through a plurality of scrubbing steps including an orifice-type scrubber or venturi nozzle scrubber such as shown in coassigned U.S. Pat. No. 3,618,296.

Substantially no particulate carbon is produced with gaseous hydrocarbonaceous fuels, such as natural gas or methane. In such case, the aforesaid gas scrubbing step may not be necessary.

$H_2S$, COS, and $NH_3$ may be present in the process gas stream depending upon the sulfur and nitrogen content of the hydrocarbonaceous feedstock to the gas generator. In a gas purification zone any gaseous impurities such as $CO_2$, $H_2S$, COS, $H_2O$, may be removed from the cooled and cleaned stream of gas leaving the gas cleaning zone. Suitable conventional processes may be used involving refrigeration and physical or chemical absorption with solvents, such as methanol, n-methylpyrrolidone, triethanolamine, propylene carbonate, or alternately with hot potassium carbonate.

In solvent absorption processes, most of the $CO_2$ absorbed in the solvent may be released by simple flashing. The rest may be removed by stripping. This may be done most economically with nitrogen. Nitrogen may be available as a low cost by-product when a conventional air separation unit is used for producing substantially pure oxygen (95 mole percent $O_2$ or more) for use as the free-oxygen containing gas used in the gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly, the $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 353. Excess $SO_2$ may be removed and discarded in chemical combination with limestone, or by means of a suitable commercial extraction process.

A stream of clean synthesis gas leaves from the gas purification zone at a temperature in the range of about 100° to 800° F and at a pressure in the range of about 10 to 180 atm. abs. and preferably 15 to 60 atm. abs. and most preferably at a pressure substantially the same as that produced in the gas generator less ordinary line drop.

Clean synthesis gas having the following composition in mole % may be made by the aforesaid process: $H_2$ 10 to 48, CO 15 to 48, and the remainder comprising $N_2+A$. At a great economic benefit, a portion of the synthesis gas may be used as said heat transfer fluid. Some of said synthesis gas may be introduced into the aforesaid loop of heat transfer fluid as make-up and to replace leakage from for example seals and flanges. The remainder of the synthesis gas may be reacted over a catalyst to produce chemicals. For example, a stream of of synthesis gas having a mole ratio ($H_2$/CO) in the range of about 2 to 12 and at a temperature in the range of about 400 to 750° F may be passed through a chamber containing methanol catalyst to synthesize methanol. The methanol catalyst may be zinc oxide, copper oxide and mixtures thereof plus a promotor selected from the group of oxides consisting of chromium, magnesium, aluminum, and mixtures thereof.

DESCRIPTION OF THE DRAWING

A more complete understanding of the invention may be had by reference to the accompanying schematic drawing which shows a preferred embodiment of the previously described process in detail. All of the lines and equipment are preferably insulated to minimize heat loss.

Referring to the figure in the drawing, free-flow noncatalytic partial oxidation gas generator 1 lined with refractory 2 as previously described has an upstream axially aligned flanged inlet port 3, a downstream axially aligned flanged outlet port 4, and an unpacked reaction zone 5. Annulus type burner 6, as previously described, with center passage 7 in alignment with the axis of gas generator 1 is mounted in inlet port 3. Center passage 7 has an upstream inlet 8 and a converging conical shaped downstream nozzle 9 at the tip of the burner. Burner 6 is also provided with concentric coaxial annulus passage 10 that has an upstream inlet 11 and a downstream conical shaped discharge passage 12. Burners of other design may also be used.

Connected to outlet port 4 is the flanged inlet port 15 of shell and tube high temperature heat exchanger 16. Optionally, a solids or slag separator (not shown in the drawing) may be inserted between outlet 4 of gas generator 1 and inlet 15 of heat exchanger 16. The upstream flanged inlet 22 of heat exchanger 23 is connected to flanged outlet port 21 of lower chamber 20. The effluent gas stream from gas generator 2 passes through outlet port 4, inlet port 15 of heat exchanger 16, internal tubes or multiple coils 17 in upper chamber 18, internal tubes or multiple coils 19 in lower chamber 20 which are in series with internal tubes or multiple coils 17, and downstream flanged outlet port 21. The partially cooled effluent gas stream passes through inlet port 22 of heat exchanger 23, tubes or multiple coils 24, and then leaves through flanged outlet port 25.

A continuous stream of hydrocarbonaceous feed in liquid or vapor form or liquid oxygenated hydrocarbonaceous fuel or a pumpable slurry of a solid carbonaceous fuel and water or liquid hydrocarbon as previously described, may be pumped into the system by way of line 30.

The hydrocarbonaceous feed stream is preheated in heat exchanger 31 by being passed through internal conduit means, for example coils 32, in noncontact indirect heat exchange with a stream of heat transfer fluid which flows through heat exchanger 31 for example on the shell side. The preheated hydrocarbonaceous feedstream in line 33 is optionally mixed with a continuous stream of superheated steam from line 34 or a stream of other temperature moderating gas from line 35, valve 36, and line 37, for example steam from line 80 in a "T" fitting or mixer (not shown). The feed mixture is then passed through line 39, inlet 11, annulus passage 10, and discharge passage 12 of burner 6 into reaction zone 5 of partial oxidation gas generator 2.

Simultaneously, a continuous stream of preheated free-oxygen containing gas from line 40 is passed through center passage 7 and nozzle 9 of burner 6 into reaction zone 5 of gas generator 1 in admixture with said hydrocarbonaceous fuel and steam. The free-oxygen containing gas enters the system through line 41 and is compressed above the pressure in the gas generator by means of turbocompressor 42. Optionally, the compressed free-oxygen containing gas may be preheated by being passed through line 43, 44, valve 45, line 46 and into heat exchanger 31 where it passes through internal conduit means i.e. coil 47, line 48, and into line 40. The free-oxygen containing gas may be preheated by noncontact indirect heat exchange with heat transfer fluid which enters heat exchanger 31 through line 49 and which then passes through on the shell side. Alternately, the free-oxygen containing gas in line 43 may be passed through line 50, valve 51, line 52, heater 53 (optional), line 54, line 40, and into burner 6.

The continuous stream of hot effluent gas leaving partial oxidation gas generator by way of outlet 4 is cooled by being passed through heat exchanger 16 first in noncontact indirect heat exchange with a counterflowing stream of heat transfer fluid, optionally followed by noncontact indirect heat exchange with a counterflowing stream of steam. For example heat transfer fluid in line 56 is passed through flanged inlet 57 and passes up through top compartment 18 of heat exchanger 16 on the shell side 58. The heat transfer fluid is heated by the down flowing effluent gas stream which flows through tubes or multi-coils 17 of heat exchanger 16. The hot heat transfer fluid leaves heat exchanger 16 by way of flanged outlet 59 and line 60. The continuous stream of partially cooled effluent gas flowing down heat exchanger 16 through multi-coils or tubes 17 then optionally passes in noncontact indirect heat exchange with a continuous up-flowing stream of steam flowing up through the shell side 61 of lower compartment 20 of heat exchanger 16. The steam picks up heat thereby and is converted into superheated steam which leaves compartment 20 through outlet nozzle 62 and line 63. Optionally, but preferably, at least a portion of said superheated steam is introduced into gas generator 1 as the temperature moderator. For example, a stream of superheated steam may be passed through lines 63, 64, valve 65, line 34 and mixed in line 39 as previously discussed with hydrocarbonaceous fuel feed. The remainder of the stream of superheated steam from line 63 may be withdrawn by way of line 66, valve 67, line 68, and may be for example introduced into a power producing steam turbine as the working fluid. In the embodiment using a third heat exchange zone, the partially cooled effluent gas stream leaves bottom compartment 20 of heat exchanger 16 through outlet 21 and enters heat exchanger 23 by way of inlet 22. In passing down through heat exchanger 23 by way of tubes of multi-coils 24, the effluent gas stream passes in noncontact indirect heat exchange with a counterflowing stream of boiler feed water passing on the shell side 69. The boiler feed water is thereby heated to produce steam by absorbing at least a portion of the remaining sensible heat in the effluent gas stream. For example, the boiler-feed water enters heat exchanger 23 through line 70 and flanged inlet 71. As the water passes up through heat exchanger 23 on the shell side 69 for example, it absorbs heat from the stream of effluent gas flowing down through heat exchanger 23 through multi-coils 24, and leaves through flanged outlet 72 and line 73 as steam. Optionally, the steam may be passed through valve 74, line 75, and flanged inlet 76 to bottom compartment 20 where it may be converted into superheated steam, as previously described. An alternate arrangement, not shown in the drawing, would have the heat transfer fluid flowing up through tubes in heat exchanger 16 in noncontact heat exchange with the raw synthesis gas flowing down through upper compartment 18 on the shell side 58. In such an embodiment no superheated steam would be produced. Similarly, in another embodiment the raw synthesis gas may flow down through heat exchanger 23 on the shell side 69 in noncontact heat exchange with water flowing up through coils 24. Compartments 18 and 20 may be contained in the same shell or in separate shells. Optionally, a portion of the steam may be removed from heat exchanger 23 by way of flanged outlet 77, line 78, valve 79, and line 80. This steam may be used elsewhere in the system for example as the working fluid in a steam turbine or to provide heat.

The cooled effluent gas stream leaves heat exchanger 23 by way of outlet 25, line 85 and optionally may be cooled further in heat exchanger 86, for example by preheating hydrocarbonaceous fuel before it is introduced into carbon removal zone 87 by way of line 88. Then by conventional methods as previously described, particulate carbon may be removed from the effluent gas stream which enters the carbon removal zone 87 by way of line 89. For example, particulate carbon may be removed by a solvent extraction process in which pumpable slurries of particulate carbon in heavy fuel oil are produced. In such case, the hydrocarbonaceous fuel enters the carbon removal zone through line 88 and the carbon slurry is removed by way of line 90. The carbon slurry may comprise at least a portion of the hydrocarbonaceous feed introduced into the system through line 30.

The clean effluent gas stream in line 91 is purified of unwanted gas impurities i.e. $CO_2$, $COS$, $H_2S$, $CH_4$, $NH_3$, etc. in gas purification zone 92 by conventional procedures, as previously described. The clean and purified product gas stream leaves through lines 93 and 94. Optionally a portion of the product gas stream is compressed and introduced into the loop of heat transfer fluid by way of line 95, valve 96, line 97, turbo compressor 98, and line 60, for example as make-up.

The heat transfer fluid circulating in the substantially closed loop may perform two functions. First, it serves as a heat transfer fluid by absorbing in heat exchanger 16 at the highest possible temperature, sensible heat from the effluent gas stream produced in the partial oxidation gas generator, and then releasing this heat in heat exchanger 31 for example to preheat hydrocarbonaceous feed stream 30, and optionally free-oxygen containing gas stream 43. Second, the heat transfer fluid may serve as the working fluid in turbine 100 which produces mechanical power by driving, for example, compressors 98 and 42, and electrical energy by driving, for example, electric generator 101. Compressors 98 and 42 are shown in the drawing to be on the same axial shaft 102-105 as turbine 100. Electric generator 101 is shown with shaft 105 connected to shaft 104 by means of flexible coupling 106. Other suitable mechanical linkages may be used for transferring the rotational power produced by expansion turbine 100.

After passing through the shell side of heat exchanger 31, the heat transfer fluid is passed through line 110, optionally through heat exchanger 111 which may be used for preheating boiler feed water, and lines 112 and 113 into compressor 98 or alternately into a pump. The loop is closed by circulating heat transfer fluid through line 56 into heat exchanger 16 for reheating. Optionally, a portion of the heat transfer fluid may be discharged from the loop by way of line 114, valve 115 and line 116.

An alternate scheme, not shown in the drawing, would be to preheat boiler feed water by heat exchange with said heat transfer fluid in heat exchanger 31 before said boiler feed water is introduced into heat exchanger 23.

EXAMPLE

The following example illustrates a preferred embodiment of the process of this invention, and it should not be construed as limiting the scope of the invention. The process is continuous and the quantities specified are on an hourly basis for all streams of materials.

EXAMPLE I

The embodiment of the invention represented by Example I is depicted in the drawing as previously described. 3,352,958 standard cubic feet (SCF) of raw synthesis gas are continuously produced in a free-flow noncatalytic gas generator by partial oxidation of an hydrocarbonaceous fuel to be further described with oxygen (about 99.7 volume percent purity). The hydrocarbonaceous fuel is a pumpable slurry comprising 1,036 pounds of particulate carbon recovered later by cleaning the raw synthesis gas product and 57,300 pounds of reduced crude oil having the following ultimate analysis in Wt. %: C 85.87, $H_2$ 11.10, S 2.06, $N_2$ 0.78, $O_2$ 0.16 and ash 0.04. Further the reduced crude oil has an API gravity of 12.5, a heat of combustion of 18,333 BTU per pound, and a viscosity of 479 Saybolt Seconds Furol at 122° F. The hydrocarbonaceous fuel was previously preheated to a temperature of 500° F by noncontact indirect heat exchange with heat transfer fluid, to be further described.

About 28,650 pounds of superheated steam produced subsequently in the process at a temperature of 750° F and a pressure of about 600 psia are mixed with said hydrocarbonaceous fuel to produce a feed mixture having a temperature of about 583° F which is continuously introduced into the annulus passage of an annulus-type burner and which discharges into the reaction zone of said gas generator. About 744062 SCF of oxygen at a temperature of about 500° F are continuously passed through the center passage of said burner and mixed with the dispersion of superheated steam, fuel oil, and particulate carbon. The oxygen stream was previously preheated by noncontact indirect heat exchange with heat transfer fluid, to be further described.

Partial oxidation and related reactions take place in the free-flow reaction zone of the gas generator to produce a continuous effluent stream of raw synthesis gas at a temperature of 2380° F and a pressure of 415 psia.

The effluent stream of hot raw synthesis gas from the gas generator passes down through the tubes of a separate first shell and tube heat exchanger comprising 2 zones. In the first zone the effluent stream of synthesis gas is cooled to a temperature of 884° F by noncontact indirect heat exchange with a continuous stream of heat transfer fluid comprising clean and purified synthesis gas passing up on the shell side. Then in the second zone the stream of raw synthesis gas passing down through the tubes is cooled to a temperature of 816° F by noncontact indirect heat exchange with 28,650 pounds of saturated steam which passes up through the shell side of the second zone of said first heat exchanger at a temperature of 468° F and a pressure of 620 psia. The saturated steam is converted into about 28,650 lbs. of superheated steam which leaves the first heat exchanger at a temperature of 750° F and a pressure of 600 psia. As previously described, at least a portion of this continuous stream of superheated steam is introduced into the gas generator, preferably in admixture with the hydrocarbonaceous fuel. Optionally, a portion of the superheated steam is used as the working fluid in a turbocompressor for example in an air separation plant for producing the free-oxygen feed to the gas generator.

The partially cooled stream of raw synthesis gas leaving the second zone of said first heat exchanger is then passed through the tubes of a separate second heat exchanger and cooled to a temperature of about 520° F by heat exchange with 28,650 lbs. of boiler feed water supplied in a continuous stream. A stream of about 28,650 lbs. of said by-product saturated steam is thereby produced at a temperature of about 488° F and a pressure of about 610 psia. As previously described, at least a portion of this saturated steam is passed into the second zone of the first heat exchanger for conversion into superheated steam.

The continuous effluent stream of raw synthesis gas leaving said second heat exchanger after heat exchange with said boiler feed water is at a pressure which is substantially the same as that in the reaction zone of the gas generator less ordinary pressure drop in the lines and heat exchangers. This pressure drop may be less than about 30 psi. The composition of the stream of raw synthesis gas leaving the second heat exchanger is as follows: $H_2$ 41.55, CO 41.59, $CO_2$ 4.61, $H_2O$ 11.46, $H_2S$ 0.40, COS 0.02, $CH_4$ 0.13, $N_2$ 0.21, and A 0.03. About 1045 lbs. of unconverted particulate carbon are entrained in the effluent stream of raw synthesis gas. Particulate carbon and other gaseous impurities may be removed from the raw synthesis gas in conventional downstream gas cleaning and purifying zones. A stream of synthesis gas product is produced having the following composition in mole %: $H_2$ 47.5, CO 47.5, $CO_2$ 4.5, and the remainder comprising a mixture of $CH_4$, A, $N_2$, and COS. A portion of said product gas is used in a substantially closed loop as the heat transfer fluid; and it also serves as the working fluid in the expansion turbine.

Thus 155,544 lbs. of said heat transfer fluid enters the first zone of said first heat exchanger at a temperature of 795° F and a pressure of 430 psia.

The stream of heat transfer fluid leaves said heat exchanger at a temperature of 2200° F and at substantially the same pressure, and is then passed through a power developing expansion turbine. The temperature and pressure of the heat transfer fluid leaving the expansion turbine is 1227° F and 47.1 psia. respectively. After passing in noncontact indirect heat exchange with the oxygen feedstream and the stream of hydrocarbonaceous feed respectively, the temperature of the heat transfer fluid is 984° F. The heat transfer fluid is then cooled to a temperature of 120° F by heat exchange with boiler feed water. Then by means of a compressor driven by said expansion turbine, the pressure of the heat transfer fluid is raised to 430 psia. Make-up $H_2$+CO may be also introduced into said compressor to account for seal leakage, etc. The aforesaid expansion turbine also provides the driving force for an oxygen feed compressor, and for an electric generator. The compressed heat transfer fluid is then recycled to said first zone of said first heat exchanger.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. In the process for producing gaseous mixtures comprising $H_2$, CO and containing at least one member of the group $H_2O$, $CO_2$, $H_2S$, COS, $CH_4$, $N_2$, A and particulate carbon, by the partial oxidation of a hydrocarbonaceous fuel, or liquid oxygenated hydrocarbonaceous fuel, or a slurry of solid carbonaceous fuel and water or a liquid hydrocarbon, with a free-oxygen containing gas and optionally in the presence of a temperature moderator, at a temperature in the range of about 1500° to 3500° F and a pressure in the range of about 1 to 250 atmospheres absolute in the reaction zone of a free-flow noncatalytic gas generator, the improvement comprising: (1) continuously passing the raw effluent gas stream leaving the reaction zone of said gas generator through a first heat exchange zone in noncontact heat exchange with a continuous stream of a gaseous heat transfer fluid selected from the group superheated steam, helium, nitrogen, argon, hydrogen, and gaseous mixtures comprising $H_2$+CO; (2) introducing the stream of hot gaseous heat transfer fluid leaving (1) into a power developing means as the working fluid and thereby producing power; (3) cooling the gaseous heat transfer fluid leaving (2) by noncontact heat exchange with at least one of the feed materials to said gas generator and optionally with water in a separate heat exchange zone; and (4) compressing the cooled gaseous heat transfer fluid leaving (3) by means of a gas compressor driven by said power developing means and recycling the compressed gaseous heat transfer fluid into the first heat exchange zone in step (1).

2. The process of claim 1 wherein a portion of said product gas is used as the heat transfer fluid and the gaseous heat transfer fluid from step (4) is recycled to the first heat exchange zone in step (1) at a temperature in the range of about 500° to 1300° F and a pressure in the range of about 150 to 1500 psia, and leaves said first heat exchange zone at a temperature in the range of about 1300° to 2800° F and at substantially the same pressure; and the power developing means in step (2) is a turbine, and gaseous heat tansfer fluid is removed therefrom having a temperature in the range of about 500° to 1800° F and at a pressure in the range of about 15 to 150 psia and is then cooled in step (3) to a temperature in the range of about 60° to 1200° F.

3. The process of claim 1 provided with the additional steps of cooling, cleaning by removing entrained solids, and purifying the raw effluent gas stream from step (1) to remove unwanted gaseous constituents, thereby producing a stream of product gas.

4. The process of claim 3 wherein the cooling of said raw gas stream is effected by noncontact heat exchange with water thereby producing saturated steam.

5. The process of claim 3 wherein the cooling of said raw gas stream is effected by direct contact with water.

6. The process of claim 1 where in step (3) the heat transfer fluid is cooled by being first passing in series in noncontact heat exchange with said feed stream of free-oxygen containing gas whose temperature is thereby increased to a value in the range of about 200° F to 1800° F, and then introducing said hot stream of free-oxygen gas into said partial oxidation gas generator; and second by passing the partially cooled stream of heat transfer fluid in noncontact heat exchange with a feed stream of hydrocarbonaceous fuel whose temperature is thereby increased to a value in the range of about 200° to 1200° F, and then introducing said hot stream of hydrocarbonaceous fuel into said partial oxidation gas generator.

7. The process of claim 1 where a portion of the power developed in step (2) from said power developing means is used to drive an electric generator.

8. The process of claim 1 wherein the free-oxygen containing gas is selected from the group consisting of air, oxygen-enriched air (more than 21 mole % $O_2$) and substantially pure oxygen (more than 95 mole % $O_2$).

9. The process of claim 1 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

10. The process of claim 1 wherein said hydrocarbonaceous fuel is a gaseous hydrocarbon.

11. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

12. The process of claim 1 provided with the additional step of removing at least a portion of unwanted solid matter from the group particulate carbon, ash, slag, scale, refractory, and mixtures thereof entrained in the effluent gas stream leaving the gas generator or flowing from the gas generator prior to introducing said gas stream into said first heat exchange zone.

13. The process of claim 1 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a vaporizable carrier such as water, liquid hydrocarbon and mixtures thereof.

14. In the process for producing gaseous mixtures comprising $H_2$, CO and containing at least one member of the group $H_2O$, $CO_2$, $H_2S$, COS, $CH_4$, $N_2$, A and particulate carbon, by the partial oxidation of a hydrocarbonaceous fuel, or liquid oxygenated hydrocarbonaceous fuel, or a slurry of solid carbonaceous fuel and water or a liquid hydrocarbon with a free-oxygen containing gas and optionally in the presence of a temperature moderator, at a temperature in the range of about 1500° to 3500° F and a pressure in the range of about 1 to 250 atmospheres absolute in the reaction zone of a free-flow noncatalytic gas generator, the improvement comprising; (1) continuously passing the raw effluent gas stream leaving the reaction zone of said gas generator through a first heat exchange zone in noncontact heat exchange with a continuous stream of gaseous heat transfer fluid which enters said zone at a temperature in the range of about 500° to 1300° F and a pressure in the range of about 150 to 1500 psia and leaves at a temperature in the range of about 1300 to 2800° F and substantially the same pressure; passing the partially cooled raw effluent gas stream from said first heat exchange zone directly into a second heat exchange zone in noncontact heat exchange with a continuous stream of steam produced subsequently in the process at a temperature in the range of about 298° to 705° F and a pressure in the range of about 65 to 3800 psia thereby converting said steam into a continuous stream of superheated steam at a temperature in the range of about 750° to 1100° F and a pressure in the range of about 65 to 3800 psia while simultaneously reducing the temperature of the continuous stream of raw effluent gas leaving said second heat exchange zone to a value in the range of about 700° to 1800° F, (2) removing a continuous stream of said superheated steam from (1) as a by-product stream; (3) continuously passing the stream of raw effluent gas leaving said second heat exchange zone directly into noncontact heat exchange with a stream of water in a third heat exchange zone thereby converting said water into a continuous stream of steam at a temperature in the range of about 298° to 705° F and a pressure in the range of about 65 to 3800 psia while simultaneously reducing the temperature of the continuous stream of raw effluent gas leaving said third heat exchange zone to a value in the range of about 320° to 730° F; (4) introducing at least a portion of the stream of steam from (3) into the second heat exchange zone in step (1) as said steam; (5) cleaning and purifying the raw effluent gas stream leaving (3) in gas cleaning and purification zones to produce a product gas stream; (6) introducing the stream of hot gaseous heat transfer fluid leaving (1) into a power developing turbine as the working fluid and removing therefrom gaseous heat transfer fluid having a temperature in the range of about 500° to 1800° F and a pressure in the range of about 15 to 150 psia; (7) cooling the gaseous heat transfer fluid leaving (6) by noncontact heat exchange with at least one feedstream which is then introduced into said gas generator; and (8) compressing the gaseous heat transfer fluid from (7) by means of a compressor powered by said turbine and recycling the gaseous heat transfer fluid into said first heat exchange zone in (1).

15. The process of claim 14 wherein said first and second heat exchange zones are contained within the same shell.

16. The process of claim 14 wherein said second and third heat exchange zones are contained within the same shell.

17. The process of claim 14 wherein said first and second heat exchange zones are contained within the same first shell and said third heat exchange zone is contained in a second shell that is separated from and connected in series with said first shell.

18. The process of claim 14 wherein said first, second, and third heat exchange zone are contained in separate shells that are connected in series.

19. The process of claim 14 wherein said heat transfer fluid comprises a portion of the product gas from step (5).

20. The process of claim 14 wherein said product gas comprises in mole %: $H_2$ 10 to 48, CO 15 to 48 and the remainder comprising a mixture of $N_2$ and A.

21. The process of claim 14 wherein at least a portion of the by-product superheated steam from step (2) is introduced into the reaction zone of said gas generator.

22. The process of claim 21 wherein said hydrocarbonaceous feed to the gas generator is entrained in said superheated steam.

23. The process of claim 14 wherin at least a portion of the by-product superheated steam from step (2) is used as the working fluid in a steam turbine used to compress air feed to an air separation unit thereby producing oxygen (95 mole % or more) for reacting in said gas generator.

24. The process of claim 14 provided with the additional step of removing at least a portion of unwanted solid matter from the group particulate carbon, ash, slag, scale, refractory, and mixtures thereof entrained in the effluent gas stream leaving the gas generator or flowing from the gas generator prior to introducing said gas stream into said first heat exchange zone.

25. The process of claim 24 wherein the effluent gas stream leaving said third heat exchange zone is at substantially the same pressure as in the reaction zone of said gas generator less ordinary pressure drop across the solids or slag separation zone, said first, second, and third heat exchange zones, and in the lines.

26. The process of claim 14 where in step (7) hydrocarbonaceous fuel is preheated to a temperature up to about 800° F but below its cracking temperature prior to introducing said fuel into the gas generator.

27. The process of claim 14 wherein said heat transfer fluid is selected from the group of gases consisting of helium, nitrogen, argon, hydrogen, superheated steam and mixtures of $H_2$+CO.

28. The process of claim 14 wherein at least a portion of the superheated steam from step (2) is introduced as the working fluid into a steam turbine for producing mechanical work or electrical energy.

29. The process of claim 14 wherein the freeoxygen containing gas is selected from the group consisting of air, oxygen-enriched air (more than 21 mole % $O_2$) and substantially pure oxygen (more than 95 mole % $O_2$).

30. The process of claim 14 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

31. The process of claim 14 wherein said hydrocarbonaceous fuel is a gaseous hydrocarbon.

32. The process of claim 14 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

33. The process of claim 14 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a carrier such as water, liquid hydrocarbon and mixtures thereof.

34. In the process for producing gaseous mixtures comprising $H_2$, CO and containing at least one member of the group $H_2O$, $CO_2$, $H_2S$, COS, $CH_4$, $N_2$, A and particulate carbon, by the partial oxidation of a hydrocarbonaceous fuel, or liquid oxygenated hydrocarbonaceous fuel, or a slurry of solid carbonaceous fuel and water or a liquid hydrocarbon, with a free-oxygen containing gas and optionally in the presence of a temperature moderator, at a temperature in the range of about 1500° to 3500° F and a pressure in the range of about 1 to 250 atmospheres absolute in the reaction zone of a free-flow noncatalytic gas generator, the improvement comprising (1) continuously passing the raw effluent gas stream leaving the reaction zone of said gas generator through the tubes of a first shell and tube-type heat exchanger in noncontact indirect heat exchange with a continuous stream of heat transfer fluid substantially comprising a mixture of hydrogen and carbon monoxide as produced in step (7), said heat transfer fluid entering said first heat exchanger on the shell side at a temperature in the range of about 500° to 1300° F and a pressure in the range of about 150 to 1500 psia and leaves at a temperature in the range of about 1300° to 2800° F and at substantially the same pressure; (2) introducing the stream of hot heat transfer fluid leaving (1) into a power developing expansion turbine as the working fluid and removing therefrom expanded heat transfer fluid having a temperature in the range of about 500° to 1800° F and a pressure in the range of about 15 to 150 psia; (3) passing the heat transfer fluid leaving (2) in noncontact indirect heat exchange with at least one other stream in a separate heat exchange zone; (4) compressing the heat transfer fluid from (3) by means of a compressor driven by said expansion turbine; (5) recycling the compressed heat transfer fluid from (4) into the shell side of said first heat exchanger in step (1); (6) cooling the partially cooled raw effluent gas stream leaving the first heat exchanger in step (1) by passing said effluent gas stream through the tubes of a second shell and tube-type heat exchanger in noncontact indirect heat exchange with steam which enters said second heat exchanger on the shell side, thereby producing by-product superheated steam; and cooling further the partially cooled raw effluent gas stream leaving the second heat exchanger in (6) by passing said effluent gas stream through the tubes of a third shell and tube-type heat exchanger in noncontact indirect heat exchange with water which enters said third heat exchanger on the shell side, thereby producing steam, and introducing said steam into the shell side of said second heat exchanger; (7) cleaning the cooled effluent gas stream from said third heat exchanger in (6) by removing entrained solids, and purifying said gas stream to remove unwanted gaseous constituents thereby producing a product gas stream substantially comprising a mixture of hydrogen and carbon monoxide; and (8) introducing a portion of said product gas stream from (7) into the compressor in step (4) as make-up heat transfer fluid.

35. The process of claim 34 provided with the additional steps of producing a stream of substantially pure hydrogen from at least a portion of the product gas stream from step (7), and using said hydrogen in the system as said heat transfer fluid.

36. In the process for producing gaseous mixtures comprising $H_2$, CO and containing at least one member of the group $H_2O$, $CO_2$, $H_2S$, COS, $CH_4$, $N_2$, A and particulate carbon, by the partial oxidation of a hydrocarbonaceous fuel, or liquid oxygenated hydrocarbonaceous fuel, or a slurry of solid carbonaceous fuel and water or a liquid hydrocarbon, with a free-oxygen containing gas and optionally in the presence of a temperature moderator, at a temperature in the range of about 1500° to 3500° F and a pressure in the range of about 1 to 250 atmospheres absolute in the reaction zone of a free-flow noncatalytic gas generator, the improvement comprising (1) continuously passing the raw effluent gas stream leaving the reaction zone of said gas generator through the tubes of a first shell and tube-type heat exchanger in noncontact indirect heat exchange with a continuous stream of heat transfer fluid selected from the group consisting of sodium, potassium, mercury and sulfur, said heat transfer fluid entering said first heat exchanger on the shell side at a temperature in the range of about 500° to 1300° F and a pressure in the range of about 150 to 1500 psia and leaves at a temperature in the range of about 1300° to 2800° F and at substantially the same pressure; (2) introducing the stream of hot heat transfer fluid leaving (1) into a power developing turbine as the working fluid and removing therefrom heat transfer fluid having a temperature in the range of about 500° to 1800° F and a pressure in the range of about 15 to 150 psia; (3) passing the heat transfer fluid leaving (2) in noncontact indirect heat exchange with at least one of the feedstreams to the gas generator in a separate heat exchange zone; (4) recycling the heat transfer fluid from (3) into the shell side of said first heat exchanger in step (1); (5) cooling the partially cooled raw effluent gas stream leaving the first heat exchanger in step (1) by passing said effluent gas stream through the tubes of a second shell and tube-type heat exchanger in noncontact indirect heat exchange with steam which enters said second heat exchanger on the shell side, thereby producing by-product superheated steam; and cooling further the partially cooled raw effluent gas stream leaving the second heat exchanger in (5) by passing said effluent gas stream through the tubes of a third shell and tube-type heat exchanger in noncontact indirect heat exchange with water which enters said third heat exchanger on the shell side, thereby producing steam, and introducing said steam into the shell side of said second heat exchanger in (5); and (6) cleaning the cooled effluent gas stream from said third heat exchanger in (5) by removing entrained solids, and purifying said gas stream to remove unwanted gaseous constituents thereby producing a product gas stream substantially comprising a mixture of hydrogen and carbon monoxide.

37. The process of claim 36 wherein the heat transfer fluid leaves step (1) as a vapor; and in step (2) cooling and condensing said vapor into a liquid; and in step (4) pumping said liquid heat exchange fluid into said first heat exchange zone in step (1) as said heat transfer fluid.

* * * * *

UNITED STATES PATENT AND TRADEMARK OFFICE
CERTIFICATE OF CORRECTION

PATENT NO. : 4,099,383
DATED : July 11, 1978
INVENTOR(S) : Peter L. Paull and Rodney McGann It is certified that error appears in the above-identified patent and that said Letters Patent are hereby corrected as shown below:

Column 14 line 52    Change "1" to --3--

Column 15 line 9    Change "passing" to --passed--

Signed and Sealed this

First Day of April 1980

[SEAL]

Attest:

SIDNEY A. DIAMOND

Attesting Officer    Commissioner of Patents and Trademarks